Patented Jan. 30, 1951

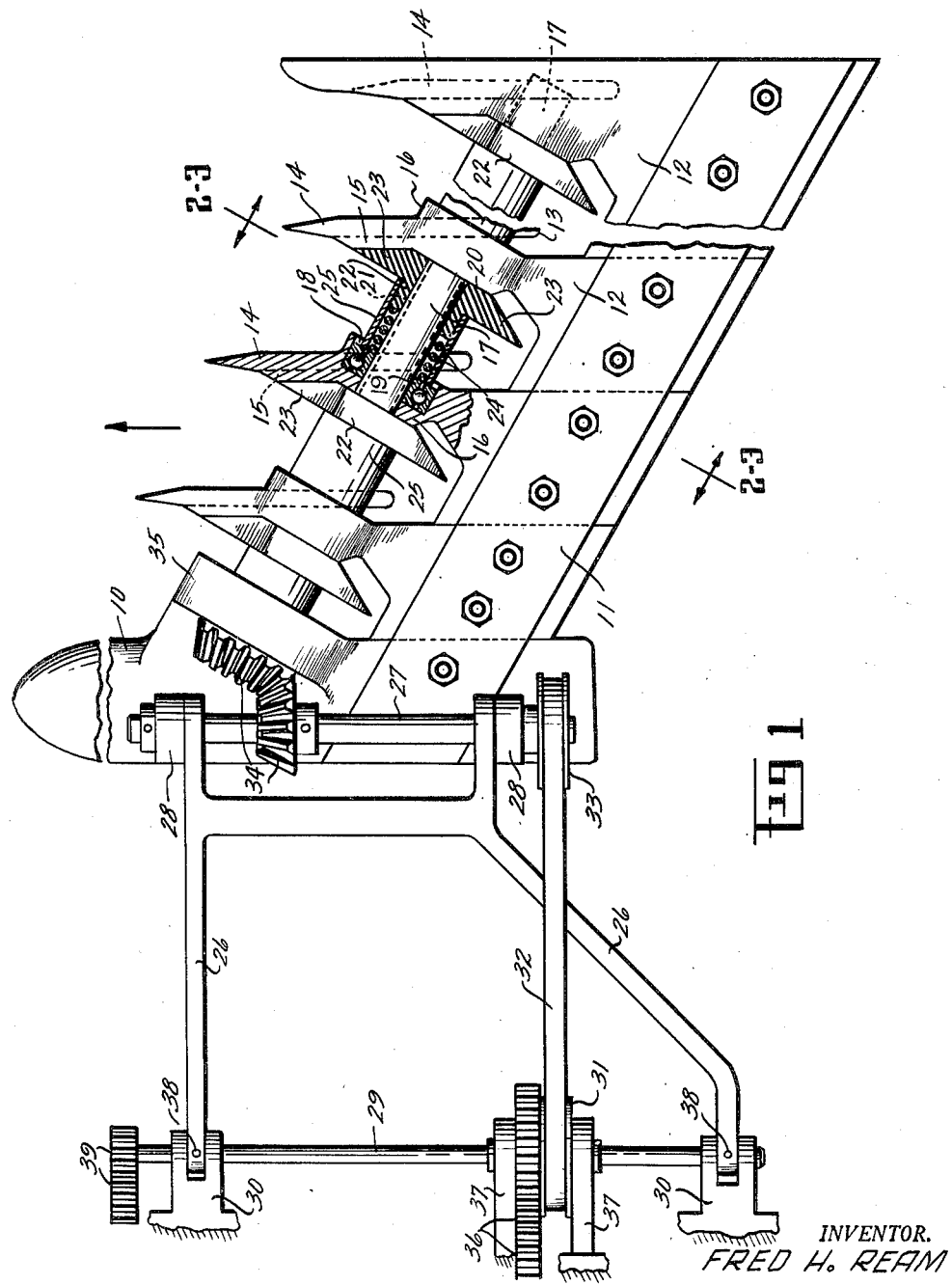

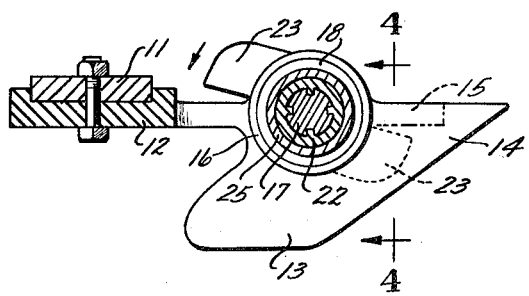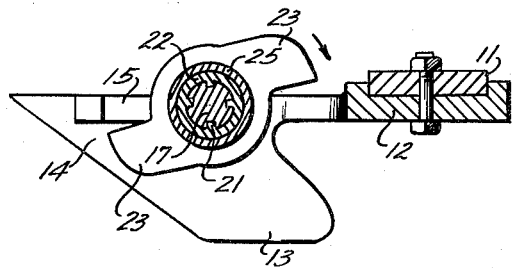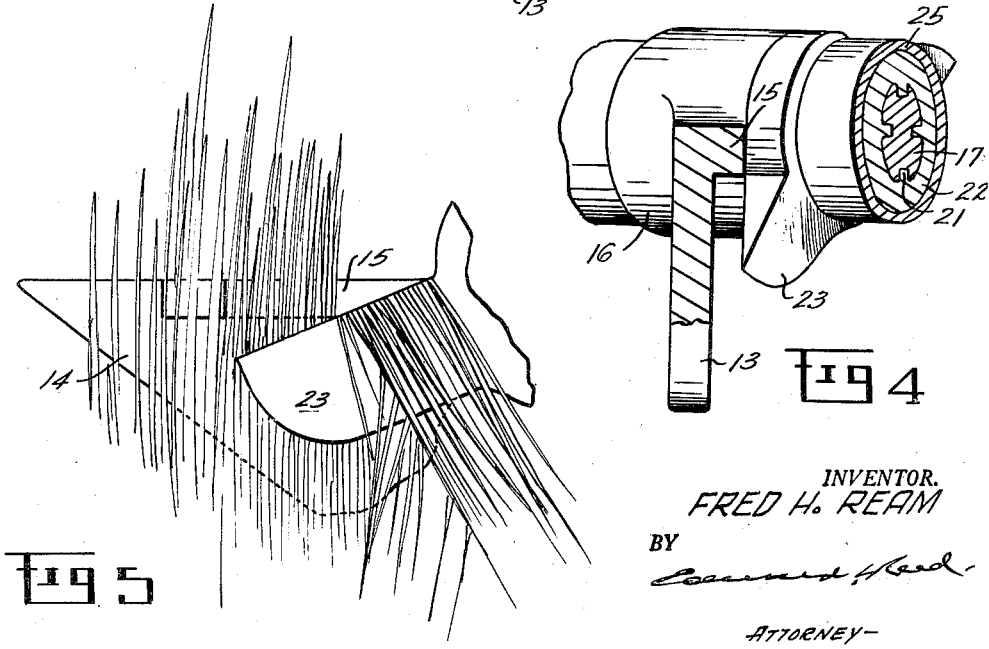

2,539,794

UNITED STATES PATENT OFFICE 2,539,794

ROTATING CUTTING-REEL TYPE MOWER

Fred H. Ream, Montgomery County, Ohio

Application August 8, 1947, Serial No. 767,607

7 Claims. (Cl. 56—294)

This invention relates to a cutting mechanism for a mower or the like.

One object of the invention is to provide a cutting mechanism which may be detachably connected with a self-propelled machine, such as a tractor, and operated thereby.

A further object of the invention is to provide such a cutting mechanism having a plurality of pairs of cutting elements each including a fixed element and a rotatable element, and having means for guiding standing grain between the cutting elements of the respective pairs of elements as the machine moves forwardly.

A further object of the invention is to provide a cutting mechanism in which rotatable cutting elements move upwardly across stationary cutting elements to more effectively sever the standing grain.

A further object of the invention is to provide a simple relatively inexpensive cutting mechanism of a strong durable construction.

Other objects of the invention may appear as the mechanism is described in detail.

In the accompanying drawings Fig. 1 is a plan view of a mechanism embodying the invention, partly in section and partly broken away; Fig. 2 is a section taken on the line 2—2 of Fig. 1 looking in the direction of the arrows; Fig. 3 is a view taken on the same line looking in the direction opposite the arrows; Fig. 4 is a section taken on the line 4—4 of Fig. 2; and Fig. 5 is a plan view of portions of one pair of cutting elements showing the elements in cutting relation.

In these drawings I have illustrated one embodiment of my invention and have shown the same of a type designed to be detachably connected with and operated by a tractor, but it is to be understood that the mechanism as a whole, as well as the several parts thereof, may take various forms and may be propelled and operated in various ways without departing from the spirit of the invention.

An elongate member 11, herein referred to as the cutter bar, is rigidly connected at its inner end with the runner 10 and extends outwardly in a line transverse to the runner, the outer portion of the cutter bar being supported by one or more runners as will be hereinafter described. Rigidly secured to and extending forwardly from the cutter bar are a plurality of structures each of which constitutes a portion of a cutting unit. These structures may take various forms and as here shown each structure includes a part 12 arranged beneath and rigidly secured to cutter bar 11 and extending forwardly therefrom, a runner 13, a guard or grain guide 14, a stationary cutting element 15 and a bearing portion 16, the several parts being preferably formed in one piece. The runner, guard and cutting element of each structure extend forwardly parallel with the main supporting runner 10 and are thus parallel with the line of movement of the mechanism as a whole. The bearing portion 16 is inclined forwardly and outwardly with relation to the line of movement of the mechanism, and the several bearing portions are in axial alinement in a line oblique to the line of movement of the mechanism. In the present instance, the cutter bar is oblique to the runner 10 and the bearings are in a line substantially parallel with the cutter bar. Mounted in the bearing portions of the several units is a shaft 17. This shaft may be supported directly in the bearing portions of the several units but preferably each bearing portion is provided on its outer side with a cavity 18 in which is mounted an anti-friction bearing, the inner race 19 of the bearing being rotatable with the shaft.

Mounted on the shaft on the inner side of each bearing 16 is a cutting element 20 which is connected with the shaft for rotation therewith and for a limited movement lengthwise thereof, as by splines 21. The two cutting elements of each unit may be of any suitable character and in the present instance the stationary cutting element 15 is in the nature of a shear bar carried by, and preferably integral with, the corresponding guard 14, and spaced rearwardly from the forward end of that guard. The rotatable cutter comprises a hub portion 22 to receive the shaft and one or more, preferably two, substantially radial blades 23. To facilitate the cutting of standing grain, or the like, the cutting elements are so arranged that the grain is severed by the upward movement of the blade or blades. For this purpose, the cutters are rotated counterclockwise, when viewed from the outer end of the mechanism, and each blade has its cutting edge on that side thereof which moves upwardly as it approaches the stationary cutting element and the stationary cutting element has its cutting edge facing downwardly. The axial movement of the rotatable cutter enables the same to be adjusted to and held in proper cutting relation to the stationary cutting element, and to compensate for wear on the parts. This adjustment of the cutter is preferably effected by a spring 24 mounted about the shaft and confined between the hub of the cutter to which it is applied and the inner race of the bearing of the next inner cutting unit. Preferably a sleeve 25 mounted on the hub of the cutter extends about the spring to prevent grain or other matter from interfering with the action of the spring.

When the mechanism is moved forwardly with the cutters in rotation the standing grain will enter the spaces between adjacent guards and will be caused thereby to enter the spaces between the movable cutting elements and the stationary cutting elements. The shaft being oblique to the line of movement of the mechanism, the stalks of standing grain will enter the spaces between adjacent guards and will be guided toward the outer one of said adjacent guards and will tend to accumulate in the outer corner of said space. The continued movement of the mechanism causes the shear bar to engage the stalks of grain and deflect the same across the lower, or cutting, edge of the shear bar and across the path of rotation of the blades. As each blade moves upwardly across the cutter bar it will engage and sever the grain which is in contact with the cutter bar substantially as shown in Fig. 5. The cutter rotates at high speed so that the cutting action is almost continuous.

The mechanism may be propelled and the cutters rotated in any suitable manner. The present mechanism is designed for connection with a tractor and means are provided whereby such a connection may be effected to both propel the mechanism and to rotate the cutter shaft. In the present arrangement the connection includes a frame having arms 26 which are mounted on a shaft 27 rotatably mounted in bearing lugs 28 on the runner 10. At their other ends the arms 26 are connected with a shaft 29 mounted in brackets 30 secured to the frame of the tractor, the arrangement being such that the cutting mechanism will be caused to move with the tractor. Also mounted on the shaft 29 is a driving element such as a pulley 31 which is connected by a belt 32 with a pulley 33 on the shaft 27. That shaft is connected by bevel gearing 34 with the cutter shaft 17, the latter shaft being rotatably supported at its inner end in a bearing lug 35 on the runner 10. In the present instance the shaft 29 is normally stationary and the pulley 31 is rotatably mounted on that shaft, and means, such as gearing 36, is provided for drivingly connecting the pulley with the power mechanism of the tractor, the pulley and the gearing being supported independently of the shaft 29 by brackets 37. The arms 26 of the connecting frame are rigidly connected with the shaft 29, as by pins 38, and means are provided for rotating the shaft 29 to move the outer ends of the arms 26 upwardly and thus elevate the cutting mechanism to an inoperative position, when it is to be transported or stored. This rotation may be imparted to the shaft 29, when desired, in any suitable manner, as by gearing 39 connecting the shaft with the power mechanism of the tractor.

While I have shown and described one embodiment of my invention, I wish it to be understood that I do not desire to be limited to the details thereof as various modifications may occur to a person skilled in the art.

Having now fully described my invention what I claim as new and desire to secure by Letters Patent is:

1. A cutting mechanism for a mower comprising an elongate structure having means whereby it may be connected with a propelling mechanism for movement therewith transversely to its length, a plurality of ground engaging supporting members secured to said structure and having alined bearings, a shaft rotatable in said bearings, a plurality of stationary cutters rigid with the respective supporting members and extending forwardly from said shaft, each of said stationary cutters including one of said ground engaging supporting members and also including a grain guide extending forwardly therefrom and rotary cutters mounted on said shaft for rotation therewith adjacent the respective supporting members, each rotary cutter including a substantially radial blade, said shaft having means whereby it may be connected with a source of power for rotation thereby in a direction to move the blades of said rotary cutters upwardly across and in cutting relation to the respective stationary blades.

2. A cutting mechanism for a mower comprising an elongate structure having means whereby it may be connected with a propelling mechanism for movement therewith transversely to its length, a plurality of ground engaging supporting members secured to said structure and having alined bearings, a shaft rotatable in said bearings, a plurality of stationary cutters rigid with the respective supporting members and extending forwardly from said shaft, each of said stationary cutters including one of said ground engaging supporting members and also including a grain guide extending forwardly therefrom, rotary cutters mounted on said shaft for rotation therewith, adjacent the respective supporting members, each rotary cutter including a substantially radial blade, said shaft having means whereby it may be connected with a source of power for rotation thereby in a direction to move the blades of said rotary cutters upwardly across and in cutting relation to the respective stationary blades, and said supporting members having parts extending forwardly beyond said cutters to guide grain to the respective stationary cutters.

3. A cutting mechanism for a mower comprising an elongate structure having means whereby it may be connected with a propelling mechanism for movement therewith transversely to its length, said structure extending obliquely to the direction of its movement by said propelling mechanism, a plurality of ground engaging supporting members mounted on said structure and extending forwardly therefrom substantially in the direction of the movement of said structure, a shaft supported on said supporting members for rotation about an axis substantially parallel with said elongate structure, a plurality of stationary cutters mounted on the respective supporting members and extending forwardly from said shaft, each of said stationary cutters including one of said ground engaging supporting members and also including a grain guide extending forwardly therefrom and rotary cutters mounted on said shaft for rotation therewith and each having a cutting edge substantially parallel with the adjacent stationary cutter, said shaft having means whereby it may be connected with a source of power for rotation thereby, to move the blades of said rotary cutters upwardly across and in cutting relation to the respective stationary blades.

4. A cutting mechanism for a mower comprising an elongate structure having means whereby it may be connected with a propelling mechanism for movement therewith transversely to its length, a plurality of ground engaging supporting members secured to said structure and extending forwardly therefrom, each supporting member including a bearing, a plurality of stationary cutters extending forwardly from the respective bearings, each of said stationary cutters being rigid with and including one of said ground engaging supporting members and also including a grain guide extending forwardly beyond said cutter, a shaft rotatably mounted in the bearings of said supporting members, and rotary cutters mounted on said shaft for rotation therewith adjacent the respective supporting members and each having a substantially radial blade to cooperate with the stationary cutter on the adjacent supporting member, said shaft having means whereby it may be connected with a source of power for rotation thereby to move the blades of said rotary cutters across and in cutting relation to the respective stationary cutters.

5. A cutting mechanism for a mower comprising an elongate structure having means whereby it may be connected with a propelling mechanism for movement therewith transversely to its length, a plurality of ground engaging supporting members secured to said structure and extending forwardly therefrom, each supporting member including a bearing, a plurality of stationary cutters extending forwardly from the respective bearings, each of said stationary cutters being rigid with and including one of said ground engaging supporting members and also including a grain guide extending forwardly beyond said cutter, a shaft rotatably mounted in the bearings of said supporting members, and rotary cutters mounted on said shaft for rotation therewith adjacent the respective supporting members and each having a substantially radial blade to cooperate with a stationary cutter on the adjacent supporting member, said shaft having means whereby it may be connected with a source of power for rotation thereby to move the blades of said rotary cutters across and in cutting relation to the respective stationary cutters.

6. A cutting mechanism for a mower comprising an elongate structure having means whereby it may be connected with a propelling mechanism for movement therewith transversely to its length, a plurality of supporting members secured to said structure and extending forwardly therefrom, each supporting member including a bearing, a stationary cutter having a cutting edge extending forwardly from said bearing and a grain guide extending forwardly beyond said cutter, a shaft rotatably mounted in the bearings of said supporting members and rotary cutters mounted on said shaft for rotation therewith adjacent the respective supporting members and for limited axial movement with relation to said shaft, each rotary cutter having a substantially radial blade to cooperate with the stationary cutter on said adjacent supporting member, said shaft having means whereby it may be connected with a source of power for rotation thereby in a direction to move the blades of said rotary cutters upwardly and in cutting relation to the respective stationary cutters, and spring means between each rotary cutter and one of said supporting members for moving said rotary cutter axially toward the stationary cutter on another of said supporting members.

7. A cutting mechanism for a mower comprising a runner having means whereby it may be connected with a propelling mechanism for movement thereby in the direction of its length, an elongate structure secured to said runner for movement therewith and extending outwardly and rearwardly therefrom in a line oblique to the length of said runner, a plurality of supporting members secured to said structure for movement therewith, each supporting member including a ground engaging part substantially parallel with said runner, and a bearing substantially parallel with said oblique structure, each supporting member also including a stationary cutter extending forwardly from said bearing in substantial parallelism with said runner and a grain guide extending forwardly beyond said cutter, a shaft rotatable in the several bearings, and a plurality of rotary cutters mounted on said shaft for rotation therewith adjacent the respective bearings, each rotary cutter having a substantially radial blade to cooperate with the stationary cutter on the adjacent supporting member, said shaft having means whereby it may be connected with a source of power for rotation thereby in a direction to move the blades of said rotary cutters upwardly across the corresponding stationary blades.

FRED H. REAM.

REFERENCES CITED

The following references are of record in the file of this patent:

UNITED STATES PATENTS

| Number | Name | Date |
|---|---|---|
| 98,182 | Neys | Dec. 21, 1869 |
| 220,256 | Shoemaker | Oct. 7, 1879 |
| 371,288 | Walker | Oct. 11, 1887 |
| 535,883 | Beekman | Mar. 19, 1895 |
| 637,649 | Newby | Nov. 21, 1899 |
| 927,612 | Stevens | July 13, 1909 |
| 937,579 | Dague | Oct. 19, 1909 |
| 1,231,174 | Koons | June 26, 1917 |
| 1,277,105 | Nimchek | Aug. 27, 1918 |
| 1,397,365 | Cook | Nov. 15, 1921 |
| 1,970,827 | Van Kesteren | Aug. 21, 1934 |